(12) United States Patent
Tan

(10) Patent No.: US 11,821,605 B2
(45) Date of Patent: Nov. 21, 2023

(54) CEILING LAMP

(71) Applicant: Lionway Electronics Co., Limited, Shenzhen (CN)

(72) Inventor: Zhengjian Tan, Shenzhen (CN)

(73) Assignee: LIONWAY ELECTRONICS CO., LIMITED, Shenzhen (CN)

( * ) Notice: Subject to any disclaimer, the term of this patent is extended or adjusted under 35 U.S.C. 154(b) by 0 days.

(21) Appl. No.: 17/731,218

(22) Filed: Apr. 27, 2022

(65) Prior Publication Data

US 2022/0349536 A1 Nov. 3, 2022

Related U.S. Application Data

(63) Continuation of application No. PCT/CN2021/127931, filed on Nov. 1, 2021.

(30) Foreign Application Priority Data

Apr. 29, 2021 (CN) .......................... 202120940968.8

(51) Int. Cl.
*F21S 8/04* (2006.01)
*F21V 8/00* (2006.01)

(52) U.S. Cl.
CPC .............. *F21S 8/04* (2013.01); *G02B 6/0051* (2013.01); *G02B 6/0055* (2013.01); *G02B 6/0088* (2013.01)

(58) Field of Classification Search
CPC .. F21S 8/04; F21V 29/70; F21V 21/02; F21V 29/71; F21V 8/00; G02B 6/0051; G02B 6/0055; G02B 6/0088
See application file for complete search history.

(56) References Cited

U.S. PATENT DOCUMENTS

| 10,591,120 B2 * | 3/2020 | Bailey ....................... F21V 5/04 |
| 2019/0146141 A1 * | 5/2019 | Huang ................. G02B 6/0061 362/606 |

\* cited by examiner

*Primary Examiner* — William J Carter

(57) ABSTRACT

A ceiling lamp includes a housing, a bottom plate, an atmosphere lamp light-transmitting plate, a first aluminum substrate, and a second aluminum substrate. The housing and the bottom plate are fixedly connected to form a mounting groove. The atmosphere lamp light-transmitting plate is fixedly mounted in the mounting groove, and the first aluminum substrate and the second aluminum substrate are fixedly mounted on the bottom plate. The first aluminum substrate is sleeved outside the second aluminum substrate, and the atmosphere lamp light-transmitting plate is sleeved on the first aluminum substrate.

8 Claims, 2 Drawing Sheets

CEILING LAMP

CROSS REFERENCE TO RELATED APPLICATIONS

This application is a continuation of international patent application No. PCT/CN2021/127931, filed on Nov. 1, 2021, which itself claims priority to Chinese patent application No. 202120940968.8, filed on Apr. 29, 2021. The contents of the above identified applications are hereby incorporated herein in their entireties by reference.

BACKGROUND

1. Technical Field

The present disclosure relates to the technical field of light fixtures, and particular to a ceiling lamp.

2. Description of Related Art

At present, conventional ceiling lamps adopt an aluminum substrate structure for heat dissipation, but a single aluminum substrate structure has an uneven heat dissipation effect and poor heat dissipation effect. The current ceiling lamp not only has a main lamp, but also has an atmosphere lamp, which increases the power and generates more heat, thereby greatly increasing the heat dissipation pressure of the ceiling lamp. The single aluminum substrate can no longer effectively dissipate heat, resulting in a short service life of the ceiling lamp and the easy scrapping of lamp beads, and the uneven heat conduction causes the problem of poor lighting effect.

BRIEF DESCRIPTION OF THE DRAWINGS

In order to more clearly illustrate the technical solutions in this embodiment disclosure, the drawings used in the embodiments or the description of the prior art will be briefly introduced below. It should be understood that, the drawings in the following description are only examples of the present disclosure. For those skilled in the art, other drawings can be obtained based on these drawings without creative works.

DETAILED DESCRIPTION

In order to make the objectives, technical solutions, and advantages of the present disclosure clearer, the present disclosure will be further described in detail below with reference to the drawings and embodiments. It should be understood that, the embodiments described herein are only for explaining the present disclosure and are not intended to limit the present disclosure.

Figure 1:
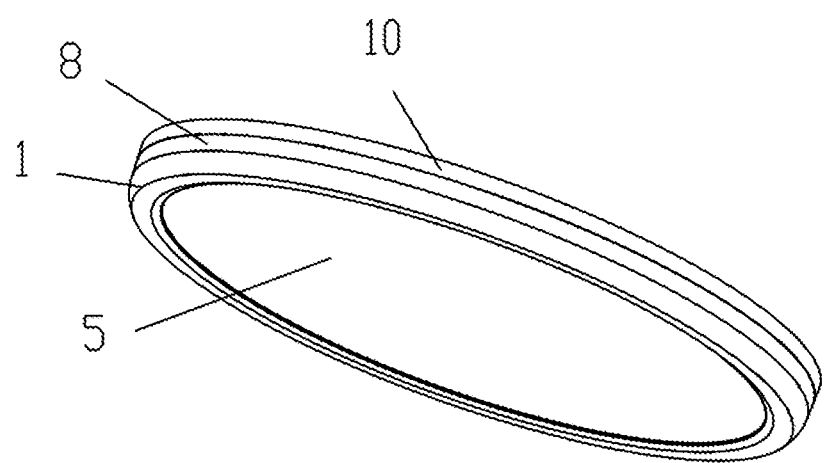
FIG. 1 is a perspective view of a ceiling lamp according to the present disclosure.
Figure 2:
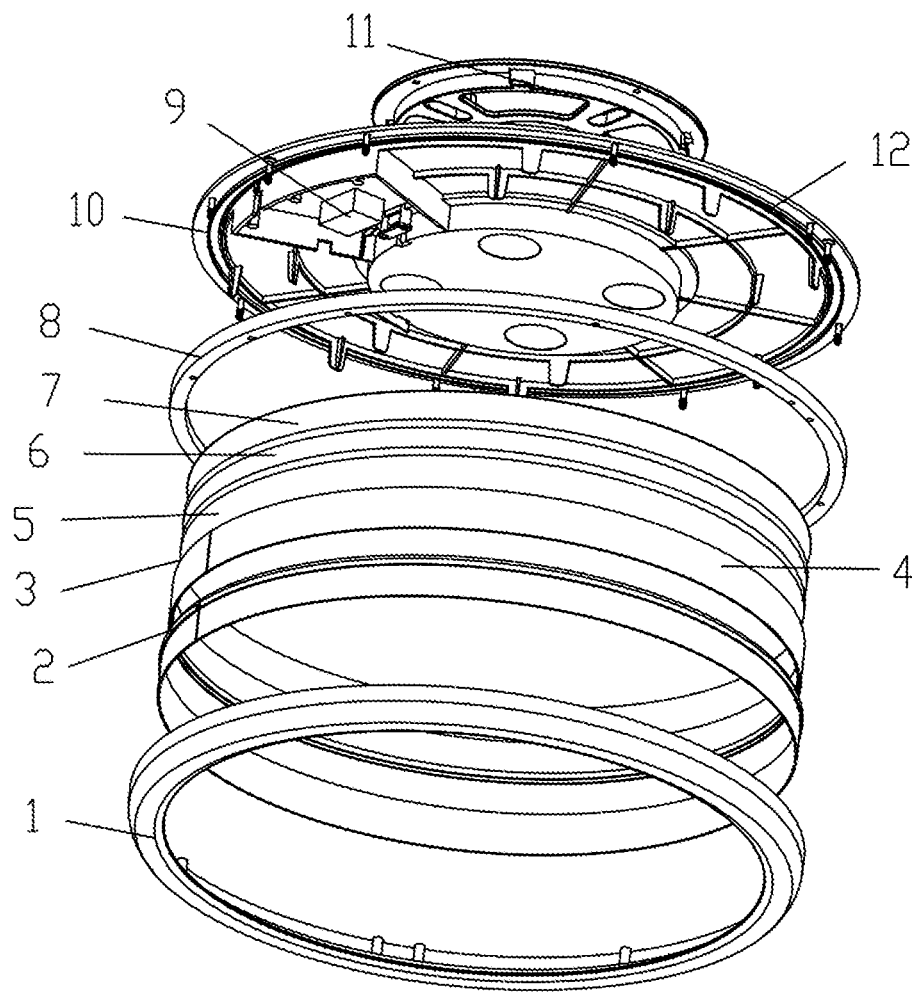
FIG. 2 is an exploded view of a ceiling lamp according to the present disclosure.

Referring to FIG. 1 to FIG. 2, a ceiling lamp according to an embodiment of the present disclosure includes a housing 1, a bottom plate 10, an atmosphere lamp light-transmitting plate 8, a first aluminum substrate 2, and a second aluminum substrate 3. The housing 1 and the bottom plate 10 are fixedly connected to form a mounting groove 12. The atmosphere lamp light-transmitting plate 8 is fixedly mounted in the mounting groove 12, and the first aluminum substrate 2 and the second aluminum substrate 3 are fixedly mounted on the bottom plate 10. The first aluminum substrate 2 is sleeved outside the second aluminum substrate 3, and the atmosphere lamp light-transmitting plate 8 is sleeved on the first aluminum substrate 2. The ceiling lamp includes a diffuser plate 5, a light guide plate 6, and reflective paper 7. The second aluminum substrate 3 is provided with a positioning groove 4, and the diffuser plate 5, the light guide plate 6, and the reflective paper 7 are stacked and mounted in the positioning groove 4. The ceiling lamp includes a fixing plate 11, and the fixing plate 11 is engaged with the bottom plate 10. The ceiling lamp includes a circuit board 9, and the circuit board 9 is fixed mounted on the bottom plate 10.

In this embodiment, in order to improve the heat dissipation effect, a structure that the first aluminum substrate 2 and the second aluminum substrate 3 are sleeved is adopted. Both the first aluminum substrate 2 and the second aluminum substrate 3 have annular structures. The diffuser plate 5, the light guide plate 6, and the reflective paper 7 are mounted in the positioning groove 4 at an inner ring of the second aluminum substrate 3. The atmosphere lamp light-transmitting plate 8 is provided with lamp beads therein. Light can not only pass through the diffuser plate 5, the light guide plate 6, and the reflective paper 7 to be emitted from the housing 1, but also pass through the atmosphere lamp light-transmitting plate 8 to form an atmosphere lamp. Heat generated in the diffuser plate 5, the light guide plate 6, the reflective paper 7, the circuit board 9, and the atmosphere lamp light-transmitting plate 8 can be dissipated by the first aluminum substrate 2 and the second aluminum substrate 3, and the heat dissipation effect is good. Incident light can be sufficiently scattered by the diffuser plate 5, so as to achieve a softer and more uniform irradiation effect. The light guide plate 6 can improve the use efficiency of light. Under the same area of luminous brightness, the luminous efficiency is high and the power consumption is low.

The ceiling lamp according to the present disclosure is mainly directed to the ceiling lamp having the atmosphere lamp. The ceiling lamp adopts the structure of double aluminum substrates to improve the heat dissipation effect, prolong the service life of the ceiling lamp, and make the lamp beads difficult to be scrapped, and the even heat conduction causes the lighting effect of the ceiling lamp better. The atmosphere lamp light-transmitting plate and two aluminum substrates cooperate with each other to produce light-emitting effects, thereby achieving perfect combination of the high light efficiency of the main lighting source and the side atmosphere light.

The above-mentioned embodiments are merely intended for describing but not for limiting the technical schemes of the present disclosure. Although the present disclosure is described in detail with reference to the above-mentioned embodiments, it should be understood by those skilled in the art that, the technical schemes in each of the above-mentioned embodiments may still be modified, or some of the technical features may be equivalently replaced, while these modifications or replacements do not make the essence of the corresponding technical schemes depart from the spirit and scope of the technical schemes of each of the embodiments of the present disclosure, and should be included within the scope of the present disclosure.

What is claimed is:

1. A ceiling lamp, comprising:
   a housing;
   a bottom plate, the housing and the bottom plate being fixedly connected to form a mounting groove;

an atmosphere lamp light-transmitting plate fixedly mounted in the mounting groove and having a ring shape;

a first aluminum substrate; and a second aluminum substrate, the first aluminum substrate and the second aluminum substrate being fixedly mounted on the bottom plate; the first aluminum substrate being sleeved outside the second aluminum substrate, and the atmosphere lamp light-transmitting plate being sleeved on a periphery of the first aluminum substrate;

wherein a cavity is enclosed by the housing, the atmosphere lamp light-transmitting plate and the bottom plate; and the first aluminum substrate and the second aluminum substrate are received in the cavity.

2. The ceiling lamp according to claim 1, further comprising a diffuser plate, a light guide plate, and a reflective paper; wherein the second aluminum substrate is provided with a positioning groove, and the diffuser plate, the light guide plate, and the reflective paper are stacked and mounted in the positioning groove.

3. The ceiling lamp according to claim 2, wherein the diffuser plate, the light guide plate, and the reflective paper are received in the cavity.

4. The ceiling lamp according to claim 1, further comprising a fixing plate, and the fixing plate being engaged with the bottom plate.

5. The ceiling lamp according to claim 4, wherein the fixing plate is mounted on a surface of the bottom plate facing away the cavity.

6. The ceiling lamp according to claim 1, further comprising a circuit board, and the circuit board being fixed mounted on the bottom plate.

7. The ceiling lamp according to claim 1, wherein each of the first aluminum substrate and the second aluminum substrate has a ring shape.

8. The ceiling lamp according to claim 1, wherein the atmosphere lamp light-transmitting plate is provided with lamp beads therein.

* * * * *